US011642279B2

(12) United States Patent
Splichal (10) Patent No.: US 11,642,279 B2
(45) Date of Patent: May 9, 2023

(54) SOMATOSENSATION AND PROPRIOCEPTOR STIMULATION SURFACE

(71) Applicant: Emily Splichal, Brooklyn, NY (US)

(72) Inventor: Emily Splichal, Brooklyn, NY (US)

(73) Assignee: NABOSO TECHNOLOGY INC., Chandler, AZ (US)

(*) Notice: Subject to any disclaimer, the term of this patent is extended or adjusted under 35 U.S.C. 154(b) by 0 days.

(21) Appl. No.: 17/028,774

(22) Filed: Sep. 22, 2020

(65) Prior Publication Data

US 2021/0000686 A1   Jan. 7, 2021

Related U.S. Application Data

(63) Continuation of application No. 15/441,553, filed on Feb. 24, 2017, now abandoned.

(51) Int. Cl.
*A61H 39/00* (2006.01)
*A61H 39/04* (2006.01)
*A43B 7/1455* (2022.01)
(Continued)

(52) U.S. Cl.
CPC .......... *A61H 39/00* (2013.01); *A43B 1/0018* (2013.01); *A43B 7/146* (2013.01); *A43B 7/149* (2013.01);
(Continued)

(58) Field of Classification Search
CPC .. A63B 26/003; A63B 21/4037; A61H 39/00; A61H 39/04; A61H 2201/1695;
(Continued)

(56) References Cited

U.S. PATENT DOCUMENTS 3,744,483 A    7/1973 Picolin
4,329,981 A    5/1982 Dungl
(Continued)

FOREIGN PATENT DOCUMENTS

CN    201481776    5/2010
CN    201959230    9/2011
(Continued)

OTHER PUBLICATIONS

Hatton et al.; "Altering Gait by Way of Stimulation of the Plantar Surface of the foot: the immediate effect of wearing textured insoles in older fallers", pp. 1-6. (Year: 2012).*

*Primary Examiner* — Catherine A. Simone
(74) *Attorney, Agent, or Firm* — Womble Bond Dickinson (US) LLP (57) ABSTRACT

A somatosensation and proprioceptor stimulation surface configured to stimulate rapid-firing nerves in the receptive field of a user's glabrous skin. The somatorsensation and proprioceptor stimulation surface includes a plurality of protuberances disposed thereupon, each protuberance sized and spaced apart appropriately to impress the receptive field when pressed in contact with the glabrous skin of the user. Each protuberance widens from an apex toward a base whereby increased pressure applied to the surface increases an area of contact and stimulation by applying stimulation over a larger area of skin. The protuberances are spaced apart to maximize stimulation of rapid firing nerves while lessening overstimulation. The somatosensation and proprioceptor stimulation surface is rendered in the form of a mat or floor covering and alternatively as an insole for wear in a user's shoes.

10 Claims, 5 Drawing Sheets

(51) Int. Cl.
*A43B 7/149* (2022.01)
*A63B 21/00* (2006.01)
*A43B 1/00* (2006.01)
*A43B 17/00* (2006.01)

(52) U.S. Cl.
CPC ............ *A43B 17/006* (2013.01); *A61H 39/04* (2013.01); *A63B 21/4037* (2015.10); *A61H 2201/1284* (2013.01); *A61H 2201/164* (2013.01); *A61H 2201/165* (2013.01); *A61H 2201/1695* (2013.01); *A61H 2203/0406* (2013.01); *Y10T 428/24479* (2015.01); *Y10T 428/24612* (2015.01)

(58) Field of Classification Search
CPC ........ A61H 2201/164; A61H 2201/165; A61H 2203/0406; Y10T 428/24479; Y10T 428/24612; A43B 1/0018; A43B 7/146; A43B 7/149; A43B 17/006
See application file for complete search history.

(56) References Cited

U.S. PATENT DOCUMENTS

| | | | |
|---|---|---|---|
| 5,158,073 | A | 10/1992 | Bukowski |
| 2014/0033565 | A1* | 2/2014 | Aruin ..................... A43B 13/38 36/43 |
| 2017/0216658 | A1 | 8/2017 | Fell |

FOREIGN PATENT DOCUMENTS

| | | |
|---|---|---|
| CN | 107397297 | 11/2017 |
| DE | 10223900 A1 | 11/2003 |
| EP | 1864779 A1 | 12/2007 |
| EP | 2238962 A1 | 10/2010 |
| GB | 2447644 A | 9/2008 |
| KR | 20040065955 | 7/2004 |
| WO | WO2009095868 A1 | 8/2009 |

\* cited by examiner

SOMATOSENSATION AND PROPRIOCEPTOR STIMULATION SURFACE

CROSS-REFERENCE TO RELATED APPLICATIONS

This Continuation-In-Part Application claims the benefit of U.S. application Ser. No. 15/441,553 filed on Feb. 24, 2017.

FEDERALLY SPONSORED RESEARCH OR DEVELOPMENT

Not Applicable

INCORPORATION BY REFERENCE OF MATERIAL SUBMITTED ON A COMPACT DISK

Not Applicable

SPECIFICATION

To all Whom it May Concern

Be it known that I, Emily Splichal, a citizen of the United States, have invented new and useful improvements in a somatosensation and proprioceptor stimulation surface as described in this specification.

BACKGROUND OF THE INVENTION

Somatosensory input from the lower limb has long been recognized as an important source of sensory information in controlling standing and balance. E.g. Paul M. Kennedy and Timothy Inglis, *Distribution and Behavior of Glabrous Cutaneous Receptors in the Human Foot Sole*, Journal of Physiology, 538.3, 995-1002 (2002). In regulating proprioception, cutaneous receptors in the sole of the foot are sensitive to contact pressures and may be sensitive to potential changes in distribution of pressures across receptive fields. Id. at 995.

Afferent signals from the small nerves in the plantar surface of the foot are known to assist in balance, posture, reducing sway, and regulating stride. E.g. Li Li et al., *The Contribution of Small and Large Sensory Afferents to Postural Control in Patients with Peripheral Neuropathy*, Journal of Sport and Health Science, 8, 218-227 (2019). Further, active control by nervous regulation of skeletal muscle is responsible for sway detection and postural correction. Id., 220. The functional role of the nervous system in "active control," the nervous regulation of skeletal muscle that requires energy expenditure in maintaining balance and posture, may be subdivided into four components: stimulation collection via sensory receptors, afferent signaling via sensory neurons, central nervous system ("CNS") control of information processing and decision making in the CNS, and efferent signaling to skeletal muscles via α-moto-neurons. Id.

Plantar cutaneous feedback, then, from the cutaneous receptors in the soles of the feet, help regulate postural sway and maintain balance. Id. See also Anna L. Hatton et al., *Altering Gait by Way of Stimulation of the Plantar Surface of the Foot: The Immediate Effect of Wearing Textured Insoles in Older Falters*, Journal of Foot and Ankle Research, 5, Article No. 11 (2012).

Providing a means of stimulating the receptor fields on a user's hands and feet during stretching, for example, or stimulating the plantar receptive fields specifically when walking or standing, say, may greatly assist a user in walking, running, standing, and in maintaining balance and posture. Further, providing a surface material with a means of effectuating an increase in stimulation of targeted receptive fields in the user's hands and feet in proportion to the pressure applied in contact with the surface may increase stimulation in proportion with the amount of weight or force applied by the user, and thereby increasingly affect the user's balance and posture when running, for example, or when applying more weight to a particular limb, as when stretching during calisthenics, or when standing or striding on one foot, for example. Increasing stimulation of receptive fields in proportion to a pressure in contact with the surface, therefore, may increase neuronal feedback to reflexively increase effective balance and posture and positively impact ambulation and rehabilitation in users with peripheral neuropathy as well as assist healthy users attain optimal performance.

FIELD OF THE INVENTION

The present invention has been devised to provide a somatosensation and proprioception stimulation surface for applying pressure to a user's glabrous skin and maximally stimulate the receptive fields in the user's hands and feet, to increase afferent stimulation proportionately with pressure applied, and to assist in maintaining balance and posture thereby, to reduce sway and to regulate stride in proportion to physical activity undertook in contact with the surface. Research has shown that stimulation of the receptive fields in the plantar surface of the foot is optimized when pressure points (herein termed "foci" to receptive fields) are not more than 5 mm nor less than 1 mm apart. Proprioception and feedback from fast responsive neurons may therefore be optimized and maximally affected by a graticulate array of foci applied to the plantar surface of the foot.

The present invention is therefore applicable to kinesthesia and joint position sense generally. The present invention is therefore operative in fields suited to increasing kinesthesia and joint position sense, such as physical therapy, calisthenics (such as yoga and stretching exercises), optimizing performance in sporting and physical activities, assisting rehabilitation, circumambulation, and other treatments affecting balance and posture, ambulation and gait including treatment of patients with peripheral neuropathy.

SUMMARY OF THE INVENTION

The present somatosensation and proprioceptor stimulation surface, described subsequently in greater detail, has been provided to stimulate the receptive fields in a user's glabrous skin when pressed in contact therewith, to increase stimulation of cutaneous receptors in proportion to the pressure applied, and thereby exploit cutaneous feedback that reflexively increases proprioception in the user and positively affects balance and posture.

The present somatosensation and proprioceptor stimulation surface includes embodiments devised for use as a mat, or flooring material, (for calisthenics, yoga, and physical activity performed generally in one place) and as in insole fitted for use in a user's shoes and configured to stimulate the plantar receptive fields during wear.

Cutaneous feedback from the receptive fields of the plantar surface of the foot assists in maintaining and correcting balance and posture. Supra. Further, configuring a stimulus to proportionately increase with pressure applied proportionally affects afferent stimulation from the associated receptive fields. Supra. Thus, as greater pressure is applied, greater stimulation results to maximize proprioception and balance and posture. Increasing proprioception with pressure is useful when engaging in physical activities where balance and posture are desirously maintained and where a range of pressures and forces is exerted. Consider, by way of example, standing on one foot: As the user's weight shifts to a single appendage, the relative pressure at the foot is increased. In conjunction with the somatosensation and proprioceptor stimulation surface contemplated herein, a greater stimulation of the receptive fields in the supporting limb would relatively increase balance to accommodate the greater need for balance as required when standing on one limb.

The present somatosensation and proprioceptor stimulation surface, therefore, incudes a plurality of protuberances upwardly projected upon a dorsal layer of the surface. Each of the plurality of protuberances is durable, at about Shore 30 A hardness or harder, from a range of approximately 30 A to 70 A, and includes an acuate apex, a medial portion, and a base. The apex pressurizes the receptive field with which it is engaged, constituting what is termed herein throughout as a "focus." A "focus," as used herein throughout, is considered the range of pressure-inducing stimulation in fast acting nerves that results from forced contact with an associated protuberance. In an example embodiment contemplated herein, each protuberance widens from the apex to the base, from a point to an area of 6.25 mm$^2$ along a height of 1.5 mm. The protuberances may thus be pyramidal, conical, ovate, or any other three-dimensional shape accommodative of such widening from a point to a base over a definite height. The material of which the dorsal surface may be manufactured may include a vibration of approximately between 5 and 15 Hz, to further aid in stimulation of the cutaneous receptors.

As pressure upon each protuberance is increased, so the contact with the receptive field is increased and the area of the focus upon the receptive field increases, as the skin is stretched and a greater portion of the protuberance is brought into contact with the receptive field. This increased stimulation of the receptive field increases proprioception and therefore reflexivity in maintaining balance and posture in proportion to the pressure or force applied, from a minimum stimulation to a maximum stimulation.

In an example embodiment of the present invention, the dorsal surface is disposed upon a mat, or flooring material, for the performance of calisthenics, stretching, physical therapy, yoga, or other localized physical activity thereupon. The plurality of protuberances is distributed upon the dorsal surface in a graticulate array wherein each protuberance is not more than 1 mm distant from surrounding protuberances and each apex is not more than 5 mm apart. This density and arrangement of protuberances has been shown create efficient distribution of foci in stimulating cutaneous receptors in the glabrous skin. The mat, or flooring material, may further include an insulating layer underlying the dorsal surface at least partially coextensive therewith, to insulate the dorsal surface from heat conduction and, in some embodiments, to absorb force of impact and lessen vibration when the surface, mat, or flooring material is in use. A basal surface may also be included having a high coefficient of friction to prevent displacement of the surface, mat, or flooring material during use, particularly upon polished or smooth surfaces.

In another embodiment of the present invention, the dorsal surface is disposed upon an insole for use in footwear. In this embodiment, the distribution of the plurality of protuberances is disposed in a graticulate array wherein each protuberance is not less than 1 mm distant from surrounding protuberances and each apex is not more than 5 mm apart. The plurality of protuberances is distributed across the dorsal surface of the insole which is adapted to conform with and to the plantar surface of the foot.

A composition of the somatosensation and proprioceptor stimulation surface and a method of its manufacture is further contemplated as part of this disclosure. The composition includes a rubber ethylene vinylene acetate (RBEVA) compound. An example composition of the somatosensation and proprioceptor stimulation surface is shown in Table 1, below. The material once produced for use has a hardness of 55 C. The RBEVA material is combined with rubber and an adhesive to assemble a layered mat for use as an in-sole or as a yoga mat. The composition of the mat is shown in Table 2.

TABLE 1

RBEVA Composition of Somatosensation and Proprioceptor Stimulation Surface

| Chemical name | ADS No. | Composition Ratio (%) by volume |
| --- | --- | --- |
| Ethylene Vinylene Acetate (EVA) | 24937-78-8 | 54.20 |
| Low Density Polyethylene (LDPE) | 9002-88-4 | 12.30 |
| ADC Foaming Agent (AC) | 123-77-3 | 3.90 |
| Dicumyl Peroxide (DCP) | 25155-25-3 | 0.49 |
| Calcium Carbonate (CaCO$_3$) | 471-34-1 | 12.20 |
| Color Masterbatch black 8502 | 1333-86-4 | 16.15 |
| Octyl Stearate | 557-05-1 | 0.25 |
| Stearic Acid | 57-11-4 | 0.24 |
| Zinc Oxide (ZnO) | 1314-13-2 | 0.27 |

TABLE 2

Somatosensation and Proprioceptor Stimulation Surface Mat

| Chemical name | Composition Ratio (%) by volume |
| --- | --- |
| RBEVA | 66.20 |
| Rubber | 30.3 |
| Adhesive | 3.50 |

Thus, has been broadly outlined the more important features of the present somatosensation and proprioceptor stimulation surface so that the detailed description thereof that follows may be better understood and in order that the present contribution to the art may be better appreciated.

Objects of the present somatosensation and proprioceptor stimulation surface, along with various novel features that characterize the invention are particularly pointed out in the claims forming a part of this disclosure. For better understanding of the somatosensation and proprioceptor stimulation surface, its operating advantages and specific objects attained by its uses, refer to the accompanying drawings and description.

BRIEF DESCRIPTION OF THE DRAWINGS

Figures

DETAILED DESCRIPTION OF THE DRAWINGS

With reference now to the drawings, and in particular FIGS. 1 through 7 thereof, example of the instant somatosensation and proprioceptor stimulation surface employing the principles and concepts of the present somatosensation and proprioceptor stimulation surface and generally designated by the reference number 10 will be described.

Figure 1:
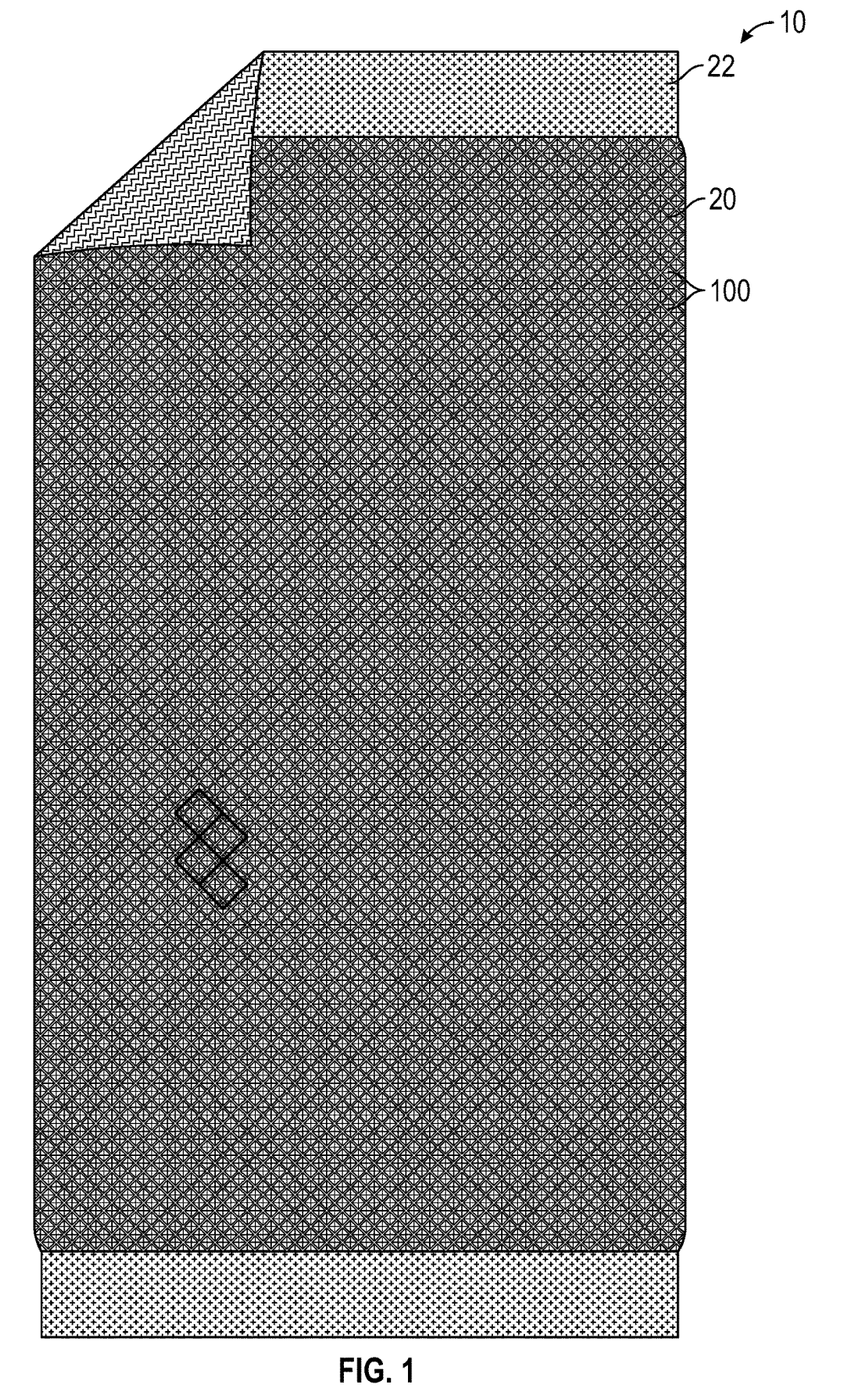
FIG. 1 is a top elevation view of an example embodiment a somatosensation and proprioceptor stimulation surface.

FIG. 1 illustrates a top elevation view of an example embodiment of the somatosensation and proprioceptor stimulation surface 10 in the form of a mat or floor covering. Here, the surface is continuously applied to cover a defined area whereon activity is to be performed. Such an embodiment may include, for example, a yoga mat, a mat for calisthenics, exercises, or for standing upon, such as are used in professions where a person is required to stand in a localized position for extended time (such as, for example, barbers or bartenders).

A dorsal surface 20 of the somatosensation and proprioceptor stimulation surface includes a plurality of protuberances 100 disposed thereover in graticulate array. Each of the plurality of protuberances 100 is sized and arranged to maximize stimulation of the receptive fields in a user's glabrous skin, such as the palmer or planter surfaces of the hands and feet respectively. The dorsal surface 20 is comprised of the EVA compound described above and comprises a Shore hardness of between approximately 30 A to 70 A. Underlying the dorsal surface 20 is a rubber portion 22, shown with ends extending beyond the ends of the dorsal surface 20. The rubber portion 22 prevents unwanted lateral displacement of the mat or floor covering in use by tractive engagement against an underlying surface upon which the mat or floor covering is used. The rubber portion 22 also may lend shock absorbent properties and additional comfort when the mat or floor covering is in use.

In the example embodiment depicted in FIG. 1, each of the protuberances 100 is pyramidal and has a base 102 of 10 mm perimeter (2.5 mm along each side) and a height of 1.5 mm. Each protuberance 100 is spaced 1 mm apart from adjacent protuberances to present a distribution of foci impressed upon the glabrous skin of the user to maximize stimulation and firing of the fast-acting nerves and to prevent overstimulation.

Figure 2:
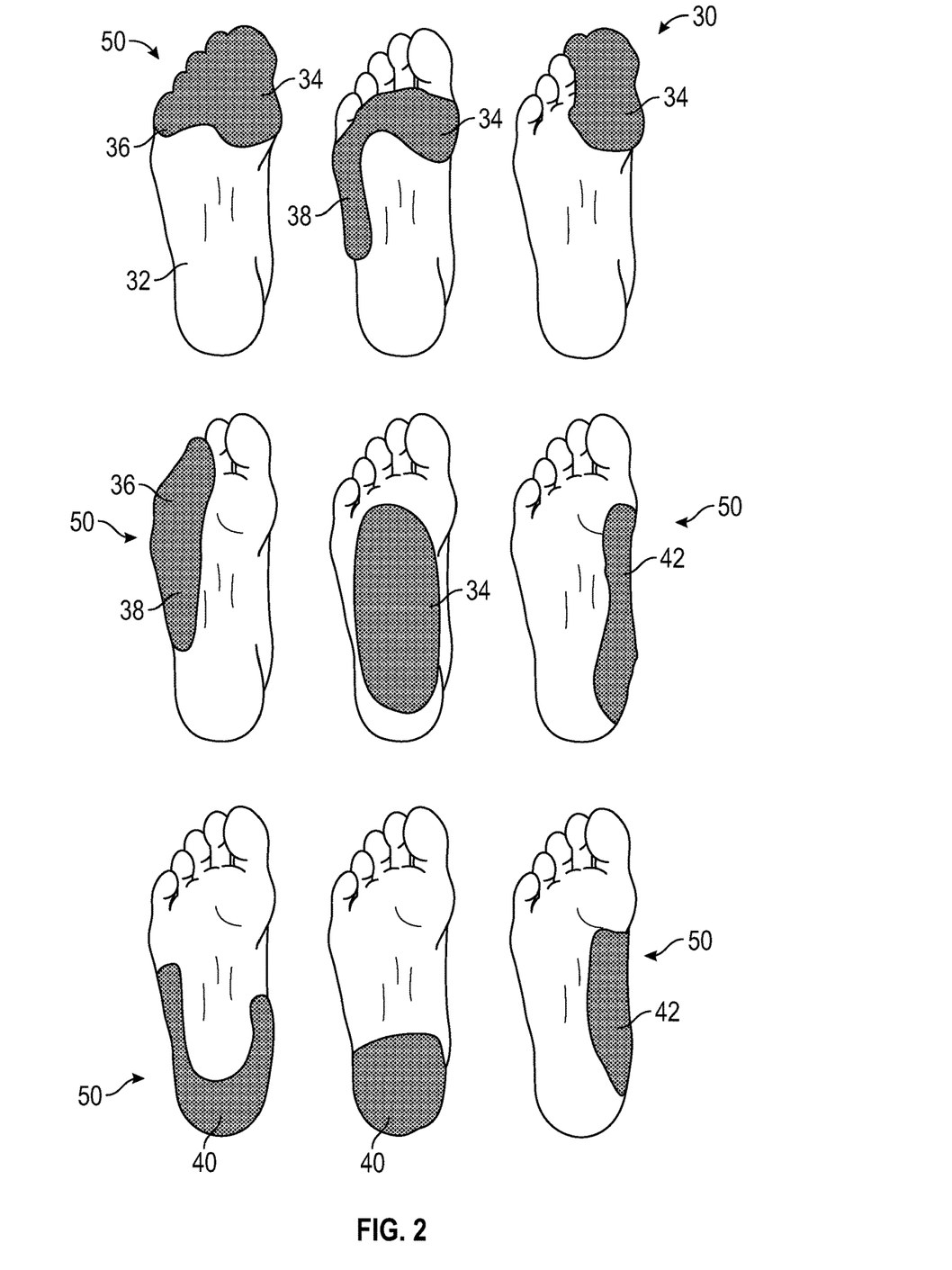
FIG. 2 is an elevation view depicting an example diagrammatic conception of receptive fields on the plantar of the user's feet.

FIG. 2 illustrates a diagrammatic view of the fascicular receptive fields 50 disposed upon the planter 32 of a user's feet 30, comprising slowly adapting (SA) and fast adapting (FA) units of the medial plantar region 34, lateral plantar region 36, sural nerve 38, left calcaneal branch of the tibial nerve 40, and saphenous nerve 42. Contact of these receptive fields 50 by the plurality of protuberances 100 when a user stands upon the somatosensation and proprioceptor stimulation surface 10 creates associated foci 60 upon the receptive field 50 to stimulate feedback responses that are believed to increase proprioception and assist balance and stride. The spacing of the plurality of protuberances 100 is calculated to maximize stimulation of the receptive field 50 by creating a focus 60 associated with each protuberance 100, each of which focus 60 is increased in area in proportion to the increasing contact effectuated by the widening of the protuberance 100 from the actuate apex 104 toward the base 102. This widening increases the area of skin stretched in contact with the protuberance 100 whereby increased neuronal stimulation and firing results.

Figure 3A:
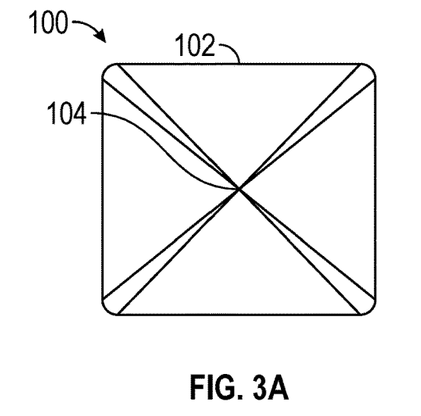
FIG. 3A is a top elevation view of an example embodiment of one of a plurality of protuberances upwardly projected upon the dorsal of the somatosensation and proprioceptor stimulation surface.
Figure 3B:
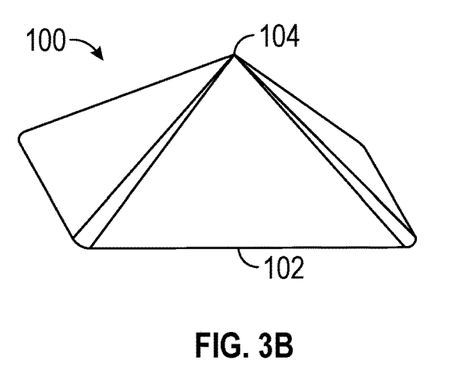
FIG. 3B is an elevation view of an example embodiment of the protuberance shown in FIG. 5A.
Figure 3C:
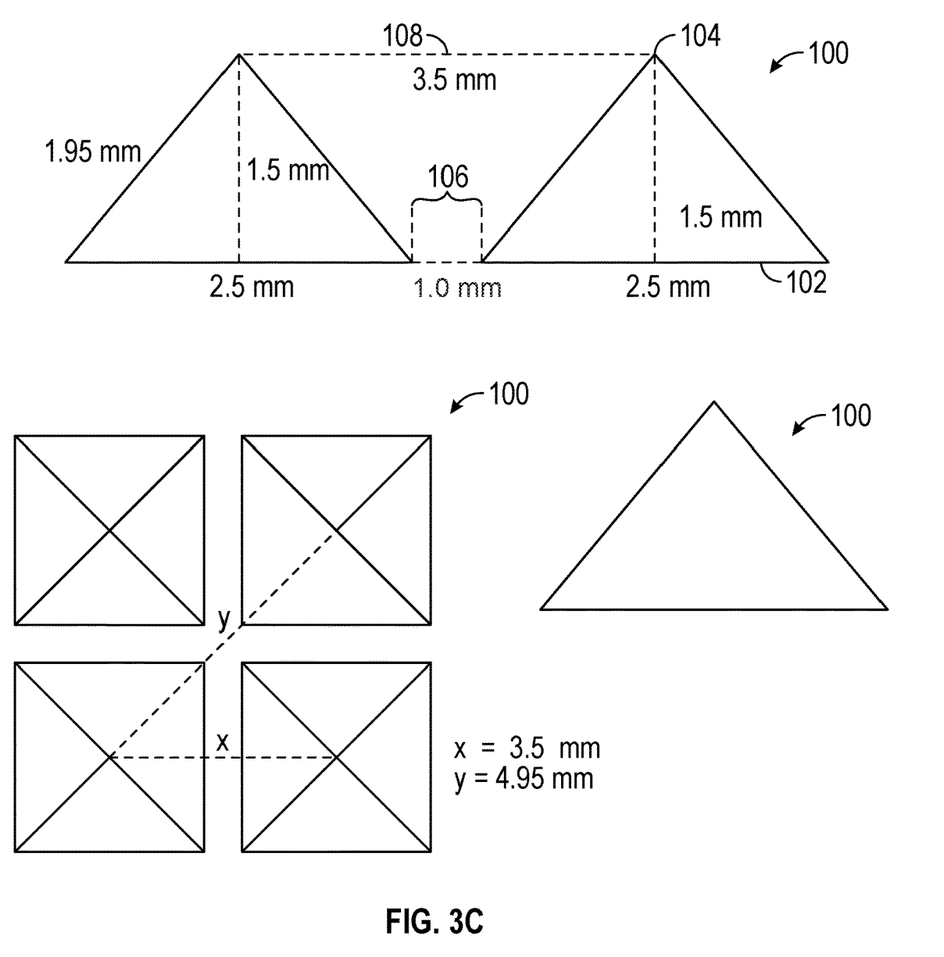
FIG. 3C is a detail view of a scaled representation of an example embodiment of spaced-apart protuberances.

FIGS. 3A and 3B show a detail view of a protuberance 100. In the example embodiment depicted, each protuberance 100 includes an actuate apex 104 and a base 102. In this example embodiment, the apex 104 is disposed 1.5 mm above the base 102. The base 102 includes four sides, 2.5 mm in length. The widening of the protuberance 100 from the apex 104 to the base 102 is maximized to create a focal impression upon a receptive field 50 of a user, thereby to increase stimulation in proportion to the pressure applied, from a minimum stimulation up to a maximum stimulation. FIG. 3C illustrates a scale drawing of protuberances 100, illustrating the specific spacing between each protuberance 100. Each protuberance 100 is disposed 1 mm spaced apart from immediately adjacent protuberances 100, thereby creating a focal area on the receptive fields 50 that does not overstimulate nerves therein. This particular spacing is therefore believed to increase or maximize proprioception. Apices 104 are not more than 5 mm apart. In a preferred embodiment depicted, apices are 3.5 mm apart. With increasing pressure, the area stimulated (the focus 60) by each protuberance 100 is increased. Each increasing focus 60 spreads but does not overlap, due to the spaced-apart bases 102 of the protuberances 100. In this manner, it is believed that stimulation of the receptive fields 50 is increased or maximized to induce fast-acting neuronal response and thereby facilitate increased proprioception and somatosensaton for improved balance and stride.

Figure 4:
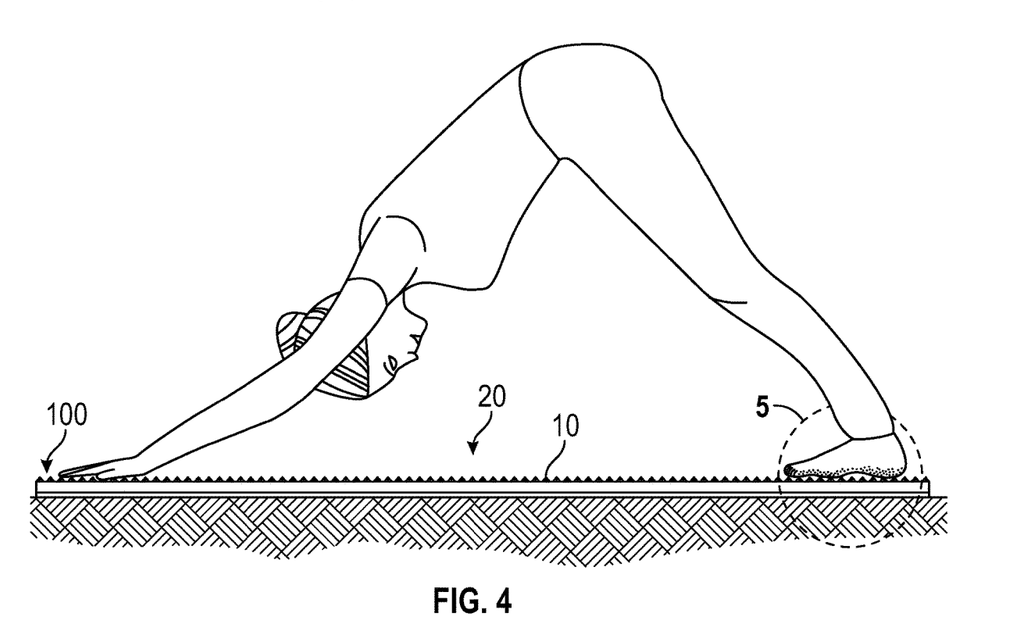
FIG. 4 is a side elevation view of an example embodiment of the somatosensation and proprioceptor stimulation surface in use in the form of a mat.
Figures 5A, 5B, 5C:
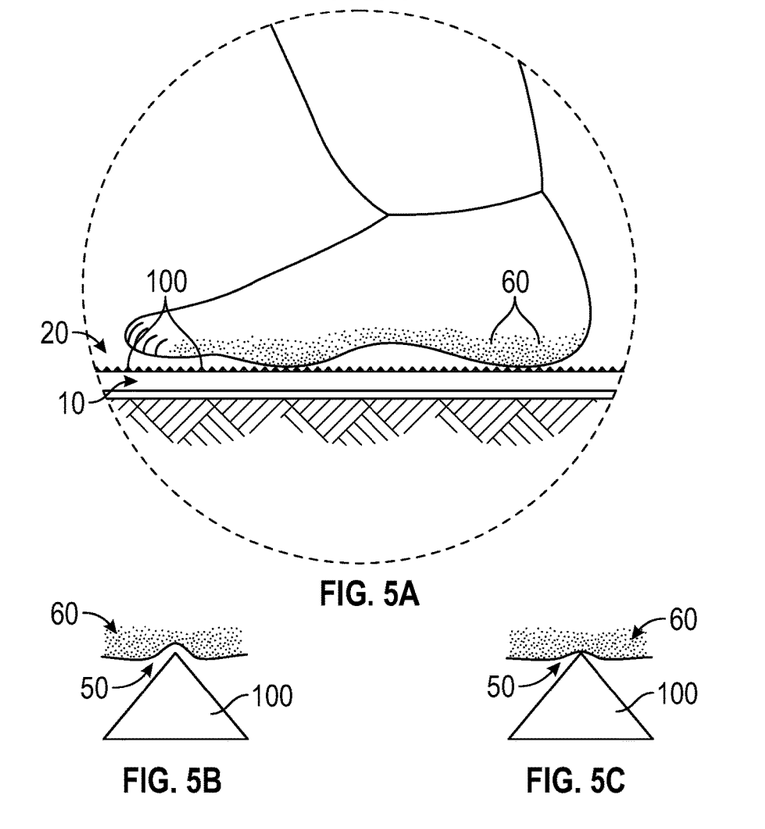
FIG. 5 is a detail elevation view of the somatosensation and proprioceptor stimulation surface.

FIG. 4 is a side elevation view of the somatosensation and proprioceptor stimulation surface 10 in use. In this example embodiment depicted, the user is performing stretching exercises upon the mat. The user's weight applied to the user's bare feet and hands increases stimulation of the receptive fields 50 in the palmer 42 and planter 32 surfaces of the glabrous skin, thereby inducing stimulation of the fast-acting nerves and reinforcing proprioception in the user. FIG. 5A is a detail side elevation view of the user in in FIG. 4, showing the foci 60 created by each protuberance 100 stimulating the plantar surface 32 of the user's foot 30. As shown in FIGS. 5B and 5C, with increased pressure the focus is enlarged to induce increased firing of the cutaneous receptors in the user's feet, and thereby proportionately increase proprioception.

Figure 6:
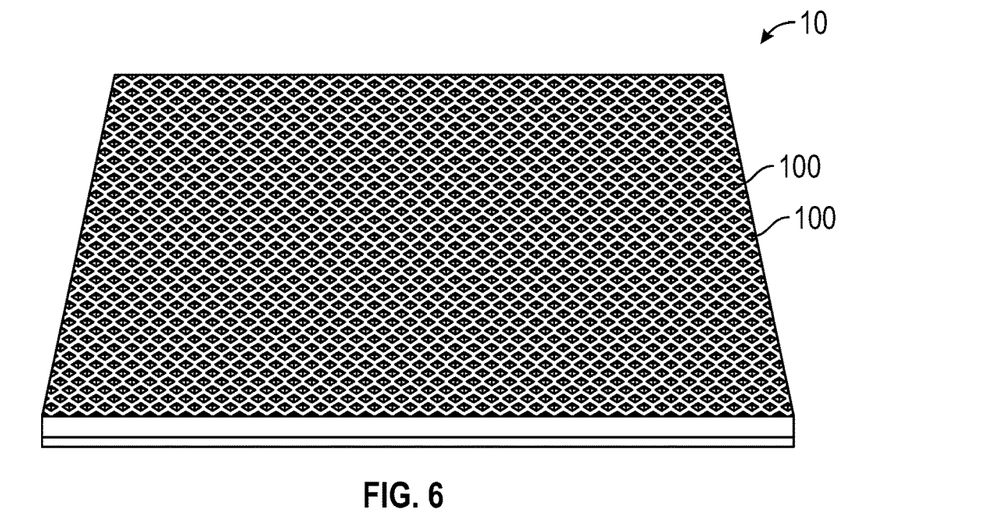
FIG. 6 is an elevation view of an example embodiment of the somatosensation and proprioceptor stimulation surface in the form of a mat.
Figure 7:
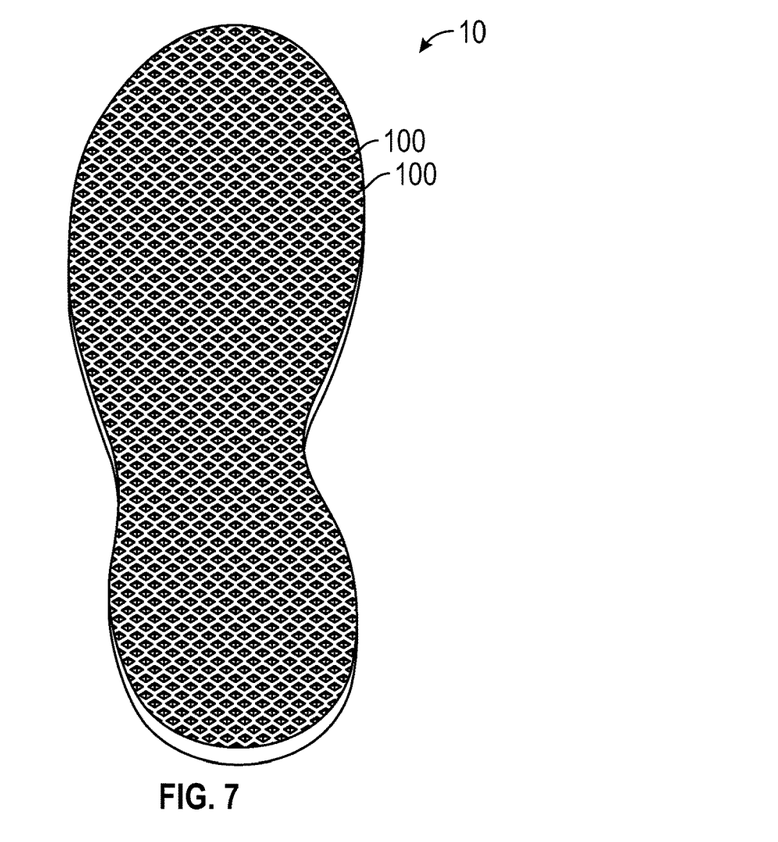
FIG. 7 is an elevation view of an example embodiment of the somatosensation and proprioceptor stimulation surface in the form of an insole.

FIG. 6 is an elevation view of an example embodiment of the somatosensation and proprioceptor stimulation surface 100 in the form of a mat or floor covering. FIG. 7 is an elevation view of an example embodiment of the somatosensation and proprioceptor stimulation surface 100 in the form of an insole for wear interior to a user's shoes to stimulate proprioception during wear.

What is claimed is:

1. A somatosensation and proprioceptor stimulation surface comprising a plurality of protuberances projected upwardly from the surface which are configured to stimulate cutaneous receptors in a user's glabrous skin when pressed in contact with a user's glabrous skin, each of said protuberances comprising:
    an acute apex;
    a medial portion; and
    a base;
wherein each of the plurality of protuberances is 0.5 mm apart between each base, is 1.5 mm in height, has a Shore hardness of approximately 30 A to 70 A, has a pyramidal shape, and is not more than 5 mm apart between each apex.

2. The somatosensation and proprioceptor stimulation surface of claim 1, wherein the surface is configured to stimulate cutaneous receptors in the glabrous skin of a user's foot.

3. The somatosenation and proprioceptor stimulation surface of claim 1, comprising by volume:
    an ethylene vinylene acetate ("EVA") compound comprising by volume:
        54.20% ethylene vinylene acetate; 12.30% low density polyethylene;
        3.90% azodicarbonamide foaming agent;
        0.49% dicumyl peroxide;
        12.20% calcium carbonate;
        0.25% octyl stearate;
        16.15 masterbatch color agent;
        0.24% stearic acid;
        0.27% zinc oxide;
    wherein 66.20% of the ethylene vinylene acetate compound is combined with
    30.3% rubber; and
    3.50% adhesive.

4. The somatosensation and proprioceptor stimulation surface of claim 1, wherein the surface is configured to stimulate cutaneous receptors in the glabrous skin of a user's hand.

5. The somatosensation and proprioceptor stimulation surface of claim 1, wherein the surface is adhered to a substrate.

6. The somatosensation and proprioceptor stimulation surface of claim 1, wherein the surface is adhered to rubber.

7. The somatosensation and proprioceptor stimulation surface of claim 1, wherein the surface is made of a rubber ethyl vinyl acetate compound.

8. The somatosensation and proprioceptor stimulation surface of claim 2, wherein the surface is made of a rubber ethyl vinyl acetate compound.

9. The somatosensation and proprioceptor stimulation surface of claim 5, wherein the surface is made of a rubber ethyl vinyl acetate compound.

10. A method for manufacturing a somatosensation and proprioceptor stimulation surface comprising:
    creating a mix by mixing by volume:
        54.20% ethylene vinylene acetate;
        12.30% low density polyethylene;
        3.90% azodicarbonamide foaming agent;
        0.49% dicumyl peroxide;
        12.20% calcium carbonate;
        0.25% octyl stearate;
        16.15 masterbatch color agent;
        0.24% stearic acid;
        0.27% zinc oxide;
    pouring the mix into a mold devised to mold the mix into a sheet having a plurality of upwardly projected protuberances, each of said plurality of protuberances rendered with a base and an apex, 1.5 mm in height, with the base having an area of 6.25 mm$^2$, and spaced 0.5 mm between each base;
    pressurizing the mold to 1,000 tons while heating to 180° C.;
    maintaining pressure for forty minutes to produce a formed sheet material;
    removing the formed sheet material; and
    adhering the formed sheet material to a planar rubber substrate.

* * * * *